(12) United States Patent  
Winterhalter

(10) Patent No.: US 8,777,252 B2  
(45) Date of Patent: Jul. 15, 2014

(54) BASKET DEVICE FOR A FOLDABLE STROLLER

(75) Inventor: Andrew J. Winterhalter, West Lawn, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 71 days.

(21) Appl. No.: 13/297,565

(22) Filed: Nov. 16, 2011

(65) Prior Publication Data

US 2012/0126511 A1 May 24, 2012

Related U.S. Application Data

(60) Provisional application No. 61/458,169, filed on Nov. 18, 2010.

(51) Int. Cl.
 *B62B 7/06* (2006.01)
(52) U.S. Cl.
 USPC .......................................... 280/642; 280/650
(58) Field of Classification Search
 USPC ........... 280/644, 38, 641, 642, 647, 650, 657, 280/658, 47.38, 47.39; 224/409
 See application file for complete search history.

(56) References Cited

U.S. PATENT DOCUMENTS

| | | | | |
|---|---|---|---|---|
| 5,464,183 A | * | 11/1995 | McConnell et al. | 248/311.2 |
| 6,152,340 A | * | 11/2000 | Chen et al. | 224/409 |
| 7,229,083 B2 | * | 6/2007 | Arai et al. | 280/47.38 |
| 7,500,692 B2 | * | 3/2009 | Espenshade | 280/647 |
| 2004/0070178 A1 | * | 4/2004 | Yoshie et al. | 280/642 |
| 2004/0090046 A1 | * | 5/2004 | Hartenstine et al. | 280/642 |
| 2004/0227330 A1 | * | 11/2004 | Everett | 280/642 |
| 2005/0161912 A1 | * | 7/2005 | Cheng et al. | 280/647 |

* cited by examiner

*Primary Examiner* — Frank Vanaman

(74) *Attorney, Agent, or Firm* — Davidson Berquist Jackson & Gowdey, LLP

(57) ABSTRACT

A basket device is used for a foldable stroller including front and rear support units. The rear support unit includes two rear support frames. The basket device includes two pivot members secured respectively to the rear support frames, two clamping members disposed respectively and rotatably on the pivot members, a curved frame, and a basket body made of a soft material. Each of the clamping members defines a passage. The curved frame has two opposite end portions extending respectively through the passages in the clamping members. The basket body has a front end fastened to the front support unit, and a rear end portion sleeved fixedly on the curved frame, such that the curved frame is generally horizontal.

8 Claims, 6 Drawing Sheets

BASKET DEVICE FOR A FOLDABLE STROLLER

CROSS-REFERENCE TO RELATED APPLICATION

This application claims priority of U.S. Provisional Application No. 61/458,169, filed on Nov. 18, 2010.

BACKGROUND OF THE INVENTION

1. Field of the Invention

This invention relates to a basket, and more particularly to a basket device for a foldable stroller.

2. Description of the Related Art

Typically, a basket of a foldable stroller is designed to have a slidable structure or a fast demountable structure. However, such a basket structure results in complication of the stroller folding process and an increase in the number of the components of the stroller. Hence, it is desirable that the foldable stroller has a pivotable structure to promote the stroller folding efficiency and reduce the number of the components of the stroller.

SUMMARY OF THE INVENTION

The object of this invention is to provide a basket device for a foldable stroller that has a simple pivotable structure and that can be folded with ease.

According to this invention, a basket device is used for a foldable stroller including front and rear support units interconnected pivotally. The rear support unit includes two rear support frames. The basket device includes two pivot members secured respectively to the rear support frames, two clamping members disposed respectively and rotatably on the pivot members, a curved frame, and a basket body made of a soft material. Each of the clamping members defines a passage. The curved frame has two opposite end portions extending respectively through the passages in the clamping members. The basket body has a front end fastened to the front support unit, and a rear end portion sleeved fixedly on the curved frame, such that the curved frame is generally horizontal due to tension of the basket body.

As such, since the clamping members are rotatable relative to the pivot members, respectively, they can be folded on the remaining components of the stroller when the stroller is folded, thereby promoting the stroller folding efficiency. Furthermore, the number of the components of the basket device is relatively small, thus resulting in a simple structure.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
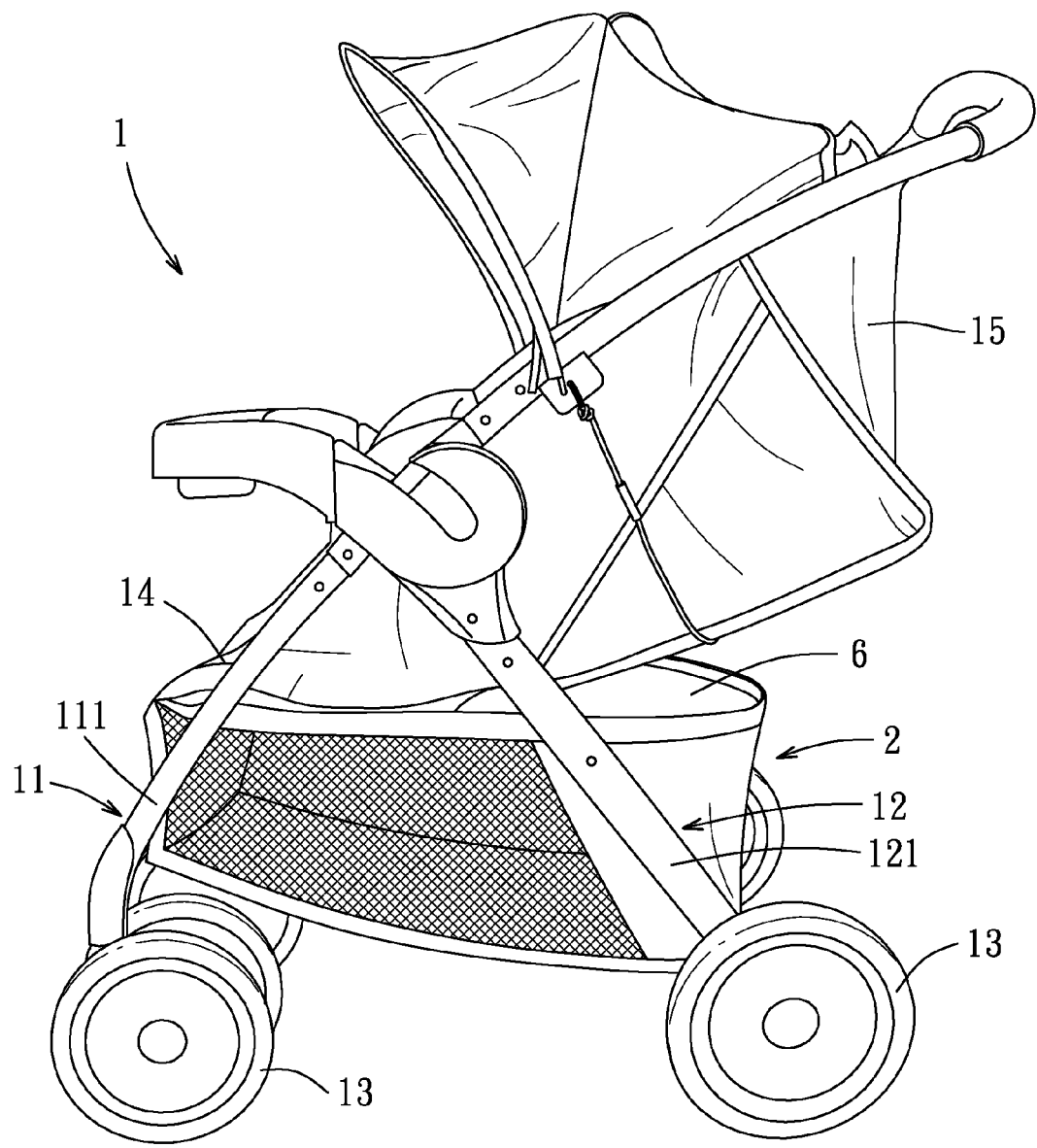
FIG. 1 is a schematic perspective view of a foldable stroller including the preferred embodiment of a basket device according to this invention.

Referring to FIG. 1, the preferred embodiment of a basket device 2 according to this invention is used in a foldable stroller 1. The foldable stroller 1 includes a front support unit 11, a rear support unit 12, a plurality of wheels 13 mounted on the front and rear support units 11, 12, a seat 14, and a cover 15. The rear support unit 12 includes two parallel support frames 121 (only one is shown) spaced apart from each other.

Figure 2:
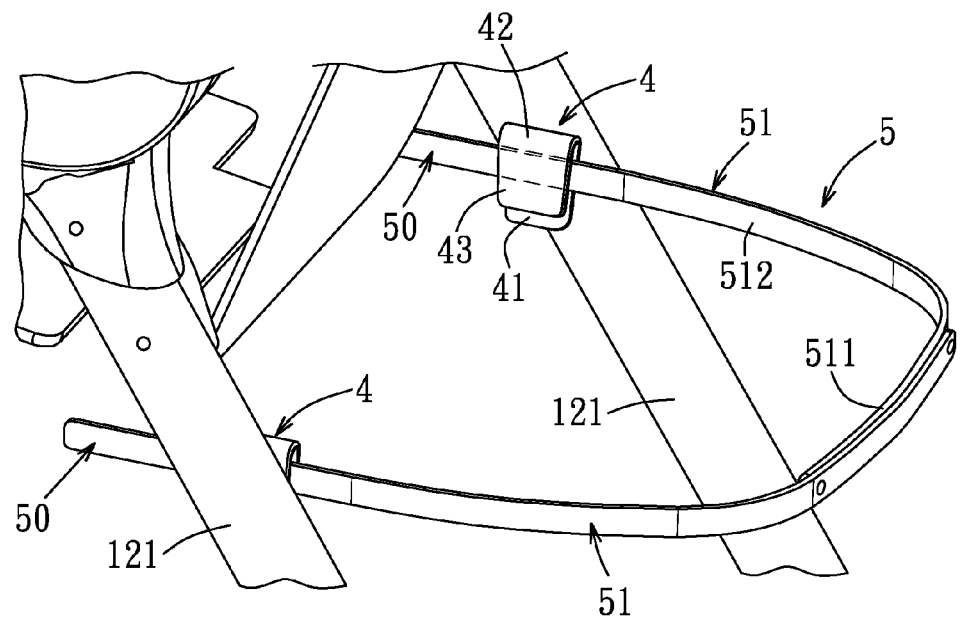
FIG. 2 is a perspective view of the preferred embodiment, a basket body being removed for illustrating a curved frame.
Figure 3:
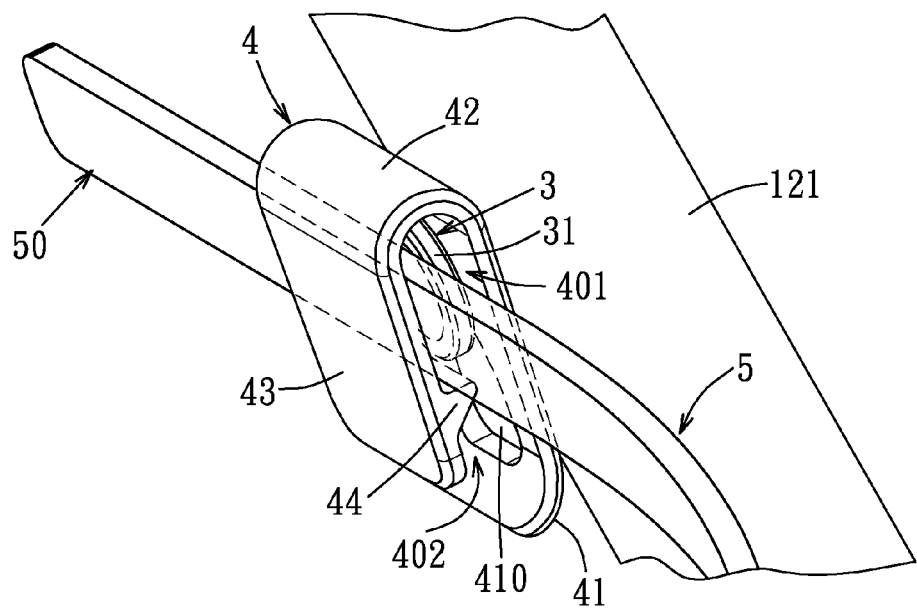
FIG. 3 is a fragmentary perspective view of the preferred embodiment, illustrating that an end portion of the curved frame extends through a passage in a clamping member.

With further reference to FIGS. 2 and 3, the basket device 2 includes two pivot members 3 secured respectively to the rear support frames 121, two clamping members 4 disposed respectively and rotatably on the pivot members 3, a curved frame 5, and a basket body 6 made of a soft material.

Figure 3A:
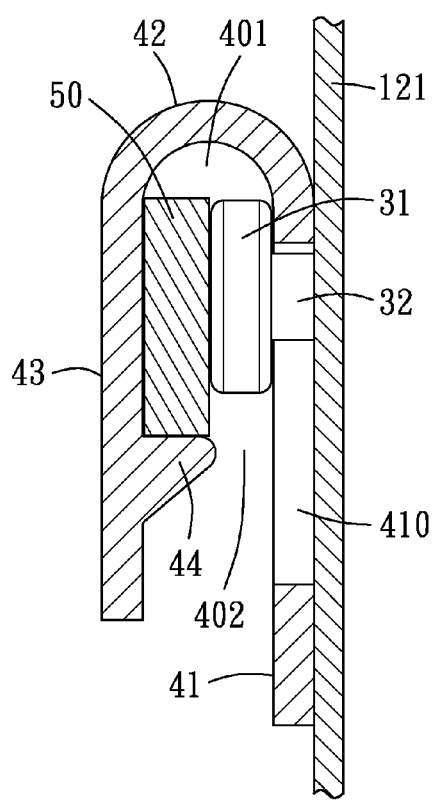
FIG. 3A is a schematic sectional view illustrating how the clamping member is connected rotatably to a rear support frame.

The pivot members 3 are riveted, threaded, or snapped into the rear support frames 121, and are aligned with each other along a horizontal direction. One of the pivot members 3 and one of the clamping members 4 at the same side will be described in the following. With further reference to FIG. 3A, the pivot member 3 has a head portion 31 and a stem portion 32 connected fixedly between the head portion 31 and the corresponding rear support frame 121 and having a diameter smaller than that of the head portion 31.

The clamping member 4 has a mounting wall portion 41, a curved connecting wall portion 42 extending from an upper side of the mounting wall portion 41, a clamping wall portion 43 extending from a side of the connecting wall portion 42 distal from the mounting wall portion 41 and parallel to the mounting wall portion 41, and a limiting block 44 extending from the clamping wall portion 43 toward the mounting wall portion 41 and spaced apart from the mounting wall portion 41. The mounting wall portion 41, the connecting wall portion 42, the clamping wall portion 43, and the limiting block 44 define cooperatively a passage 401 extending along a front-to-rear direction. The limiting block 44 cooperates with the mounting wall portion 41 to define an opening 402.

Figure 3B:
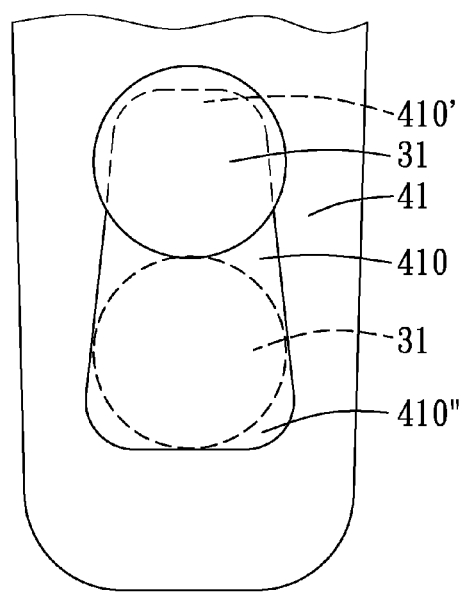
FIG. 3B is a schematic side view illustrating movement of a pivot member within a pivot hole that is generally trapezoidal.

With further reference to FIG. 3B, the mounting wall portion 41 is formed with a generally trapezoidal pivot hole 410. The stem portion 32 extends through the pivot hole 410. The pivot hole 410 has a narrow hole portion 410' aligned with the passage 401 and sized so as not to permit the head portion 31 to move therethrough, and a wide hole portion 410" disposed at an end of the pivot hole 410 distal from the passage 401 and permitting the head portion 31 to move therethrough. During assembly of the clamping member 4 to the pivot member 3, the clamping member 4 is first moved to align the wide hole portion 410" with the pivot member 3. Next, the clamping member 4 is moved toward and into contact with the corresponding rear support frame 121 in such a manner to allow the head portion 31 to move through the wide hole portion 410". Finally, the clamping member 4 is moved downwardly relative to the pivot member 3, so as to move the head portion 31 into the passage 401 through the opening 402. At the same time, the stem portion 32 is moved from the wide hole portion 410" into the narrow hole portion 410'. Preferably, the head portion 31 has a thickness greater than the distance between the limiting block 44 and the mounting wall portion 41 along a transverse direction of the corresponding rear support frame 121 for preventing removal of the head portion 31 from the passage 401 via the opening 402 when no external force is applied to the clamping member 4. In other words, the head portion 31 has a thickness greater than the width of the opening 402. If necessary, the clamping wall portion 43 can be pulled away from the mounting wall portion 41 to increase the width of the opening 402 so as to allow the pivot member 3 or the curved frame 5 to move through the opening 402.

Figure 4:
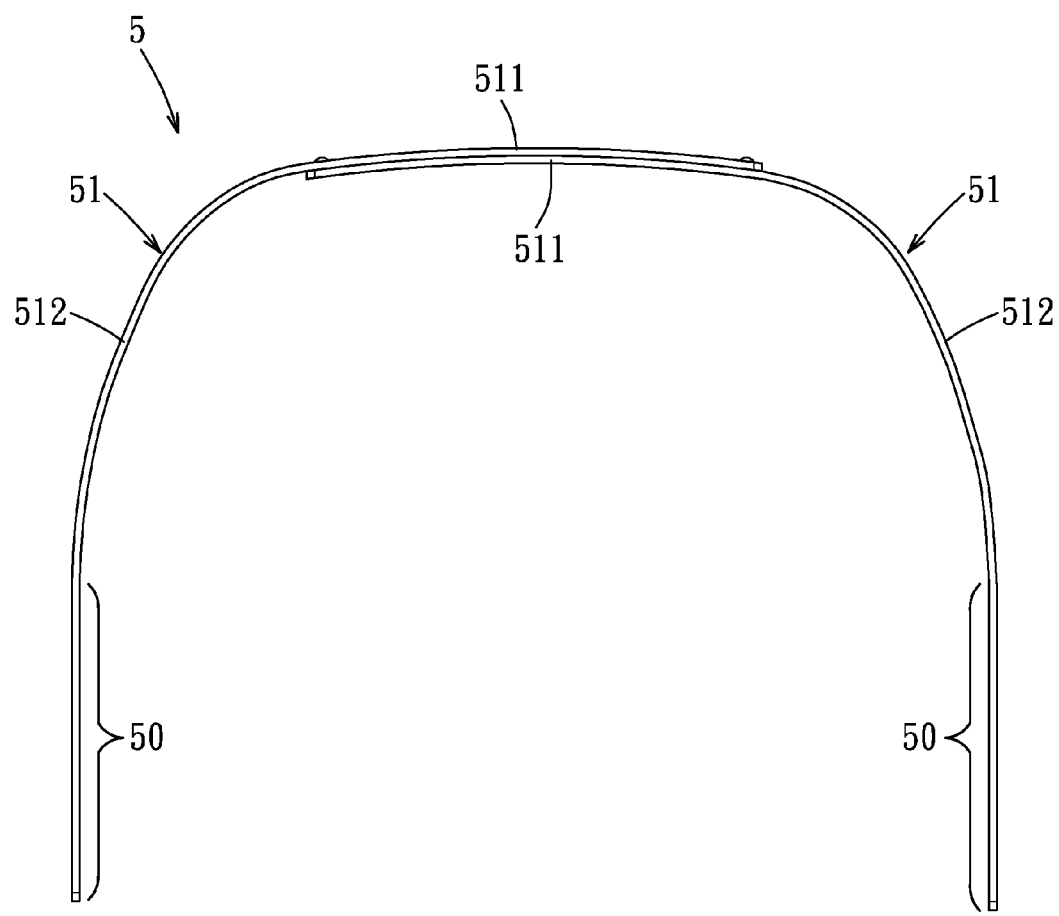
FIG. 4 is a top view of the curved frame of the preferred embodiment.

With further reference to FIG. 4, the curved frame 5 is U-shaped, and has two opposite end portions 50. In this embodiment, the curved frame 5 includes two frame strips 51 that are plastic extrusions. Preferably, the curved strips 51 are made of acetyl or polypropylene. Each of the frame strips 51 has a connecting section 511 overlapping and connected fixedly to the connecting section 511 of the other of the frame strips 51, and a supporting section 512 extending and bent from an end of the connecting section 511 distal from the other of the frame strips 51. The end portions 50 of the curved frame 5 are disposed respectively at the supporting sections 512 of the frame strips 51, and are suspended and received in the basket body 6. It should be noted that, during manufacture, the overlapping length (i.e., the length of the connecting section 511) can be adjusted to change the total length and shape of the curved frame 5. Furthermore, since the connecting sections 511 of the frame strips 51 overlap each other, the curved frame 5 can be reinforced and has a quite square shape for providing a better capacity than an ordinary stroller basket. The curved frame 5 may be designed as one piece which has a thicker section, e.g., double thickness section between two end portions.

The end portions 50 of the curved frame 5 extend respectively through the passages 401 in the clamping members 4, and are supported by the limiting blocks 44, respectively. Each of the end portions 50 extends through the passage 401 and over the clamping member 4, and is clamped between the clamping wall portion 43 and the head portion 31 of the pivot member 3.

With particular reference to FIG. 1, the basket body 6 has a front end fastened to the front support unit 11. In this embodiment, the front support unit 11 includes two parallel front support frames 111. The front end of the basket body 6 has two sides riveted or snapped to the front support frames 111, respectively. A rear upper end portion of the basket body 6 is tubular, and is sleeved on the curved frame 5. In this embodiment, portions of the curved frame 5 disposed within the clamping members 4 are not in contact with the basket body 6.

Since the front end of the basket body 6 is fastened to the front support frames 111 in such a manner that a portion of the basket body 6 disposed between the front support frame 111 and the clamping member 4 receives the suspended end portion 50, and since the remaining portion of the basket body 6 is supported by the curved frame 5, when the front and rear support frames 111, 121 are unfolded, the basket body 6 is stretched by the front support frames 111 and the curved frame 5, and the front end of the basket body 6 can prevent upward movement of the end portions 50 of the curved frame 5 so as to maintain the curved frame 5 in a horizontal position. When the front and rear support frames 111, 121 are folded such that the front support frames 111 are pivoted toward the rear support frames 121, since the end portions 50 of the curved frame 5 are no longer supported and pulled by the basket body 6, and since a rear portion of the curved frame 5 disposed behind the pivot member 3 is longer and heavier than a front portion of the curved frame 5 disposed in front of the pivot member 3, the rear portion of the curved frame 5 pivots downwardly to abut against the support frames 121 due to the weight itself without assistance of any returning mechanism (such as a spring).

Figure 5:
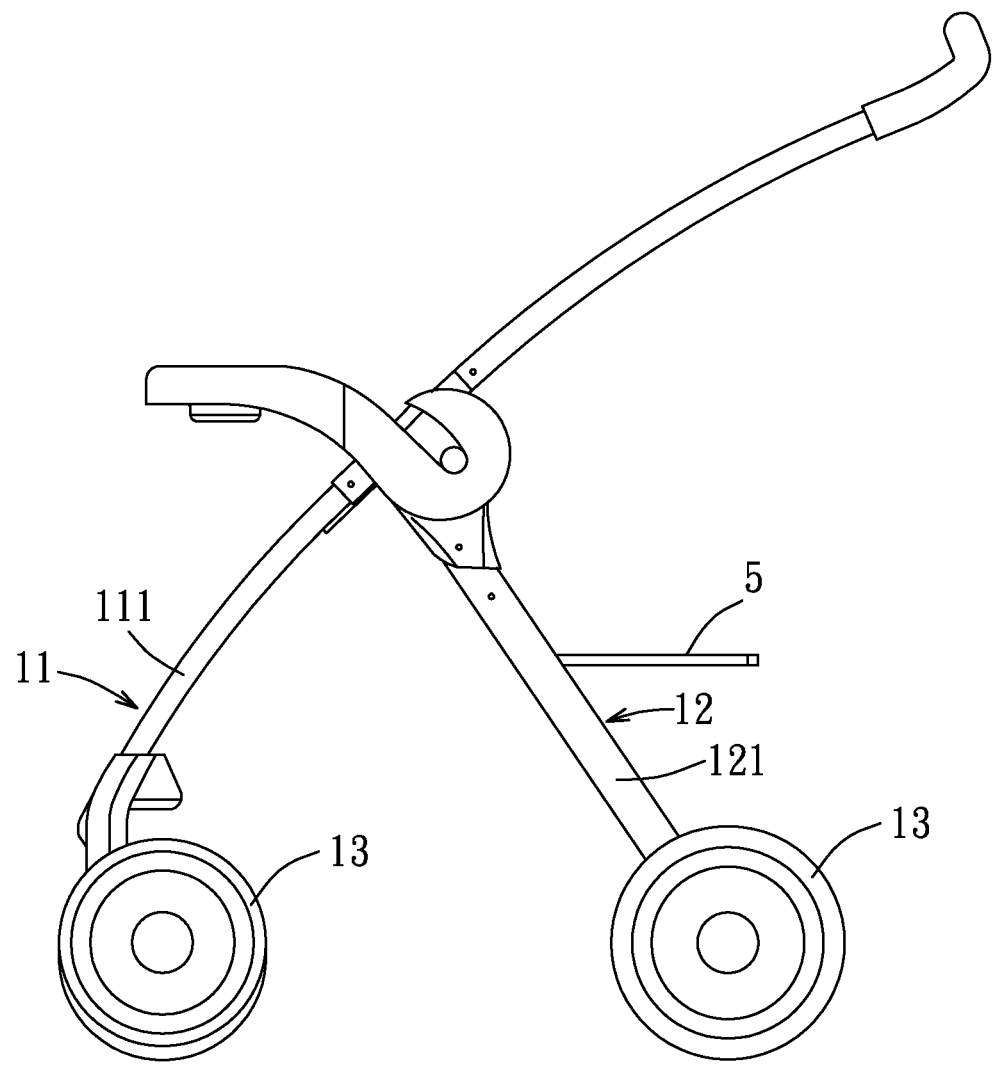
FIG. 5 is a side view of the stroller in an unfolded state.

With particular reference to FIG. 1 and FIG. 5, when the stroller is unfolded, since the curved frame 5 is supported by the clamping members 4, and since the front end of the basket body 6 is fastened to the front support unit 11, the curved frame 5 is kept in a generally horizontal position due to tension of the basket body 6. The connecting sections 511 can be pressed downwardly to facilitate a huge article to be placed into the basket device 2. When it is desired to clean the basket device 2, the clamping members 4 can be removed from the pivot members 3 by moving the clamping member 4 relative to the pivot members 3 to align the wide hole portions 410" with the pivot members 3 and then away from the rear support frames 121. An assembly of the curved frame 5 and the basket body 6 can be removed in other manners, e.g., by pulling the clamping member 4 to widen the opening 402 and subsequently removing the end portions 50 from the passages 401 to separate the curved frame 5 and the clamping member 4 from each other.

Figure 6:
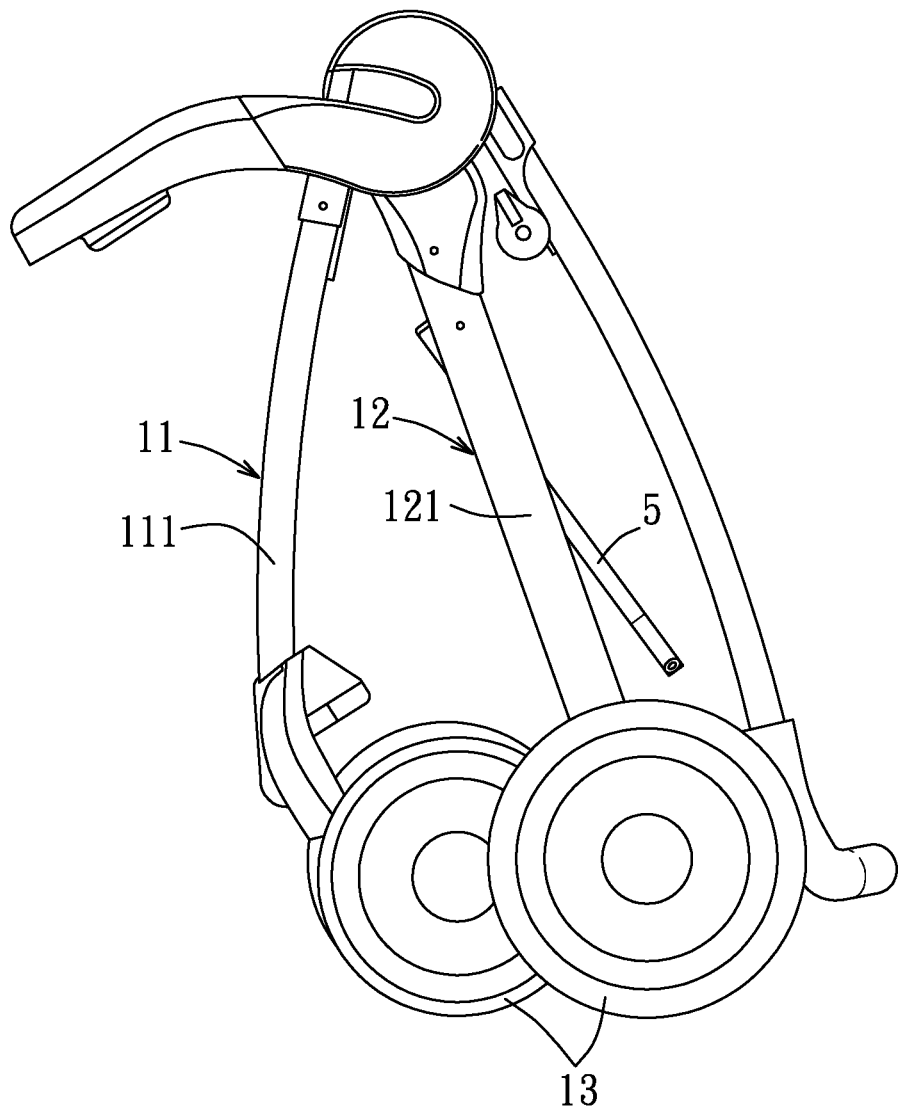
FIG. 6 is a side view of the stroller in a folded state.

With further reference to FIG. 6, when the stroller is folded, since the curved frame 5 is rotatable relative to the rear support frames 121, the stroller folding operation can be performed with relative ease. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A basket device adapted for use in a foldable stroller, the foldable stroller including a front support unit and a rear support unit that are interconnected pivotally, the rear support unit including two parallel rear support frames, said basket device comprising two pivot members adapted to be secured respectively to the rear support frames, two clamping members disposed respectively and rotatably on said pivot members, a curved frame, and a basket body made of a soft material, said curved frame having two opposite end portions extending respectively through said clamping members, said basket body having a front end fastened to said front support unit, and a rear end portion sleeved on said curved frame, such that said curved frame is generally horizontal due to tension of said basket body;

wherein said curved frame includes two frame strips, each of said frame strips having a connecting section, said connecting sections of said frame strips being connected together, said end portions of said curved frame being disposed respectively at said frame strips; and wherein each of said frame strips has one end connected to said one end of the other of said frame strips, and the other ends of said frame strips are suspended and received in said basket body.

2. The basket device as claimed in claim 1, wherein each of said clamping members has a mounting wall portion formed with a pivot hole permitting extension of said pivot member therethrough, a connecting wall portion extending from a side of said mounting wall portion, a clamping wall portion extending from a side of said connecting wall portion distal from said mounting wall portion and parallel to said mounting wall portion for clamping a corresponding one of said end portions of said curved frame between said clamping wall portion and a corresponding one of said pivot members, and a limiting block extending from said clamping wall portion toward said mounting wall portion and spaced apart from said mounting wall portion, so as to define a passage among said mounting wall portion, said connecting wall portion, said clamping wall portion, and said limiting block, said limiting block of each of said clamping members cooperating with said mounting wall portion of a corresponding one of said clamping members to define an opening therebetween, through which the corresponding one of said end portions of said curved frame is movable into said passage of the corresponding one of said clamping members when said curved frame is assembled to said pivot members, said passage of each of said clamping members extending along a front-to-rear direction, said two opposite end portions of said curved frame extending respectively through said passages in said clamping members.

3. The basket device as claimed in claim 2, wherein:
each of said pivot members has a head portion disposed within said passage in a corresponding one of said clamping members, and a stem portion having a diameter smaller than that of said head portion and adapted to connect said head portion fixedly to a corresponding one of the rear support frames; and
said pivot hole in said mounting wall portion of each of said clamping members is generally trapezoidal, and permits said stem portion of a corresponding one of said pivot members to move therethrough, and has a narrow hole portion aligned with said passage in a corresponding of said clamping members and sized so as not to permit said head portion of the corresponding one of said pivot members to move therethrough, and a wide hole portion disposed at an end thereof distal from said passage in the corresponding one of said clamping members and permitting said head portion of the corresponding one of said pivot members to extend therethrough.

4. The basket device as claimed in claim 1, wherein said curved frame has a non-uniform thickness.

5. The basket device as claimed in claim 1, wherein said one end of each of said frame strips overlaps said one end of the other of said frame strips.

6. The basket device as claimed in claim 1, wherein said basket body has a tubular rear upper end portion permitting said curved frame to extend therethrough.

7. A basket device adapted for use in a foldable stroller, the foldable stroller including a front support unit and a rear support unit that are interconnected pivotally, the rear support unit including two parallel rear support frames, said basket device comprising two pivot members adapted to be secured respectively to the rear support frames, two clamping members disposed respectively and rotatably on said pivot members, a curved frame, and a basket body made of a soft material, said curved frame having two opposite end portions extending respectively through said clamping members, said basket body having a front end fastened to said front support unit, and a rear end portion sleeved on said curved frame, such that said curved frame is generally horizontal due to tension of said basket body;
wherein each of said clamping members has a mounting wall portion formed with a pivot hole permitting extension of said pivot member therethrough, a connecting wall portion extending from a side of said mounting wall portion, a clamping wall portion extending from a side of said connecting wall portion distal from said mounting wall portion and parallel to said mounting wall portion for clamping a corresponding one of said end portions of said curved frame between said clamping wall portion and a corresponding one of said pivot members, and a limiting block extending from said clamping wall portion toward said mounting wall portion and spaced apart from said mounting wall portion, so as to define a passage among said mounting wall portion, said connecting wall portion, said clamping wall portion, and said limiting block, said limiting block of each of said clamping members cooperating with said mounting wall portion of a corresponding one of said clamping members to define an opening therebetween, through which the corresponding one of said end portions of said curved frame is movable into said passage of the corresponding one of said clamping members when said curved frame is assembled to said pivot members, said passage of each of said clamping members extending along a front-to-rear direction, said two opposite end portions of said curved frame extending respectively through said passages in said clamping members.

8. The basket device as claimed in claim 7, wherein:
each of said pivot members has a head portion disposed within said passage in a corresponding one of said clamping members, and a stem portion having a diameter smaller than that of said head portion and adapted to connect said head portion fixedly to a corresponding one of the rear support frames; and
said pivot hole in said mounting wall portion of each of said clamping members is generally trapezoidal, and permits said stem portion of a corresponding one of said pivot members to move therethrough, and has a narrow hole portion aligned with said passage in a corresponding of said clamping members and sized so as not to permit said head portion of the corresponding one of said pivot members to move therethrough, and a wide hole portion disposed at an end thereof distal from said passage in the corresponding one of said clamping members and permitting said head portion of the corresponding one of said pivot members to extend therethrough.

* * * * *